(12) United States Patent
Pham et al.

(10) Patent No.: US 12,380,448 B2
(45) Date of Patent: *Aug. 5, 2025

(54) MOBILE AUTHENTIFICATION METHOD VIA PEER MOBILES

(71) Applicant: Capital One Services, LLC, McLean, VA (US)

(72) Inventors: Vincent Pham, Champaign, IL (US); Austin Grant Walters, Savoy, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,986

(22) Filed: Jan. 5, 2024

(65) Prior Publication Data

US 2024/0296449 A1 Sep. 5, 2024

Related U.S. Application Data

(63) Continuation of application No. 16/864,404, filed on May 1, 2020, now Pat. No. 11,869,004.

(51) Int. Cl.
*G06Q 40/00* (2023.01)
*G06Q 20/30* (2012.01)
(Continued)

(52) U.S. Cl.
CPC ....... *G06Q 20/4014* (2013.01); *G06Q 20/308* (2020.05); *G06Q 20/4015* (2020.05);
(Continued)

(58) Field of Classification Search
CPC ............ G06Q 20/4014; G06Q 20/308; G06Q 20/4015
See application file for complete search history.

(56) References Cited

U.S. PATENT DOCUMENTS 10,325,259 B1 * 6/2019 Shahidzadeh .......... G06Q 20/40
2008/0126258 A1 * 5/2008 Jacobs ................. G06Q 20/322
705/64

(Continued)

OTHER PUBLICATIONS

Knutson, Jack (Setting up Google Authenticator on Multiple Devices, https://medium.com/@jackknutson333/setting-up-google-authenticator-on-multiple-devices Mar. 3, 2019) (Year: 2019).*

*Primary Examiner* — Mark H Gaw
(74) *Attorney, Agent, or Firm* — KDW Firm PLLC

(57) ABSTRACT

Embodiments include systems and techniques to perform secure transactions including processing registration information for each computing device of a plurality of computing devices having authority over a financial account. In one example, embodiments include receiving a pending transaction against the financial account from a computing device. Embodiments include executing an authentication protocol to determine the computing device is a member of the plurality of computing devices based upon the registration information, and processing data identifying another computing device within a configurable distance from the computing device. Embodiments further include the system to execute the authentication protocol to determine the other computing device is a member of the plurality of computing devices based upon the registration information and bypass a portion of a security procedure for authorizing execution of the pending transaction.

17 Claims, 7 Drawing Sheets

(51) Int. Cl.
*G06Q 20/40* (2012.01)
*H04W 4/02* (2018.01)
*H04W 12/06* (2021.01)
*H04W 12/63* (2021.01)

(52) U.S. Cl.
CPC ............ *H04W 4/023* (2013.01); *H04W 12/06* (2013.01); *H04W 12/63* (2021.01)

(56) References Cited

U.S. PATENT DOCUMENTS

| | | | | |
|---|---|---|---|---|
| 2016/0132851 A1* | 5/2016 | Desai | ................. | G06Q 20/3227 705/21 |
| 2016/0189136 A1* | 6/2016 | Mercille | ............... | H04W 12/06 705/44 |

* cited by examiner

100

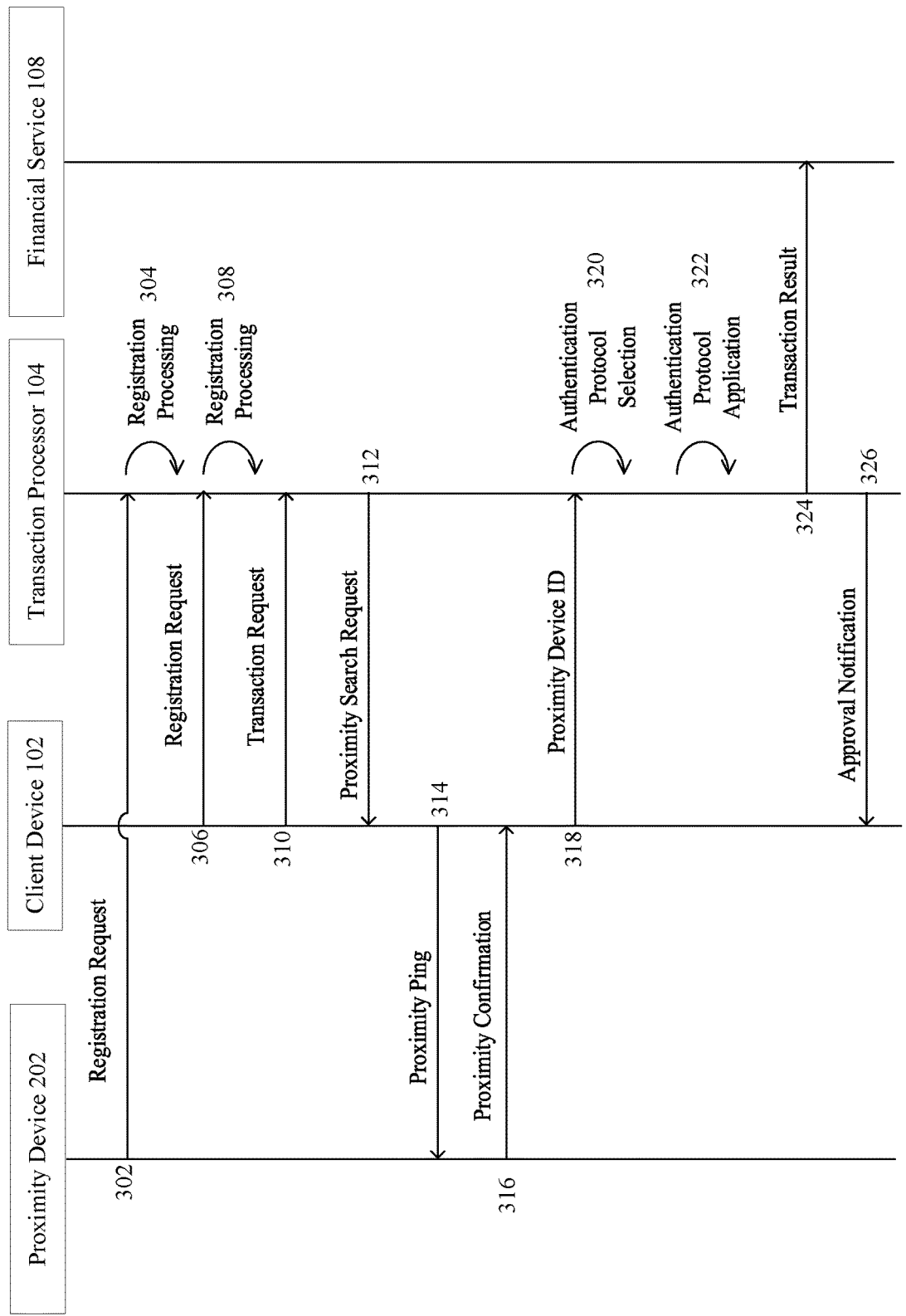

500

600

MOBILE AUTHENTIFICATION METHOD VIA PEER MOBILES

CROSS-REFERENCE TO RELATED APPLICATIONS

This application claims the benefit of priority to U.S. patent application Ser. No. 16/864,404, filed May 1, 2020, now U.S. Pat. No. 11,869,004, the entirety of which is incorporated herein by reference.

BACKGROUND

Information systems may facilitate and manage transaction applications. In the realm of computer or database transactions, a transaction may refer to an atomic change of state. In the realm of business or finance, a transaction may denote an exchange of an economic entity, for example, a currency. Information systems may require user authentication in order to complete a transaction.

SUMMARY

Embodiments are generally directed to systems and techniques to process transactions securely. For example, embodiments may include a system, device, and/or method to process registration information including at least one identifier for each computing device of a plurality of computing devices having authority over a financial account, at least one computing device comprising an integrated circuit being configured to execute electronic transactions against the financial account. Embodiments include a system to receive a pending transaction against the financial account, the pending transaction being submitted by a first computing device. Further in response to the pending transaction, embodiments include the system to execute an authentication protocol to determine whether the first computing device is a member of the plurality of computing devices based upon the registration information, and upon determining that the first computing device is a member of the plurality of computing devices, process data identifying a second computing device within a configurable distance from the first computing device. Embodiments further include the system to execute the authentication protocol to determine whether the second computing device is a member of the plurality of computing devices based upon the registration information, and upon determining that the second computing device is a member of the plurality of computing devices, bypass a portion of a security procedure for authorizing execution of the pending transaction.

BRIEF DESCRIPTION OF THE DRAWINGS

FIGS. 3A-B are data flow diagrams depicting exemplary information exchange according to one or more embodiments described herein.

DETAILED DESCRIPTION

Figure 1:
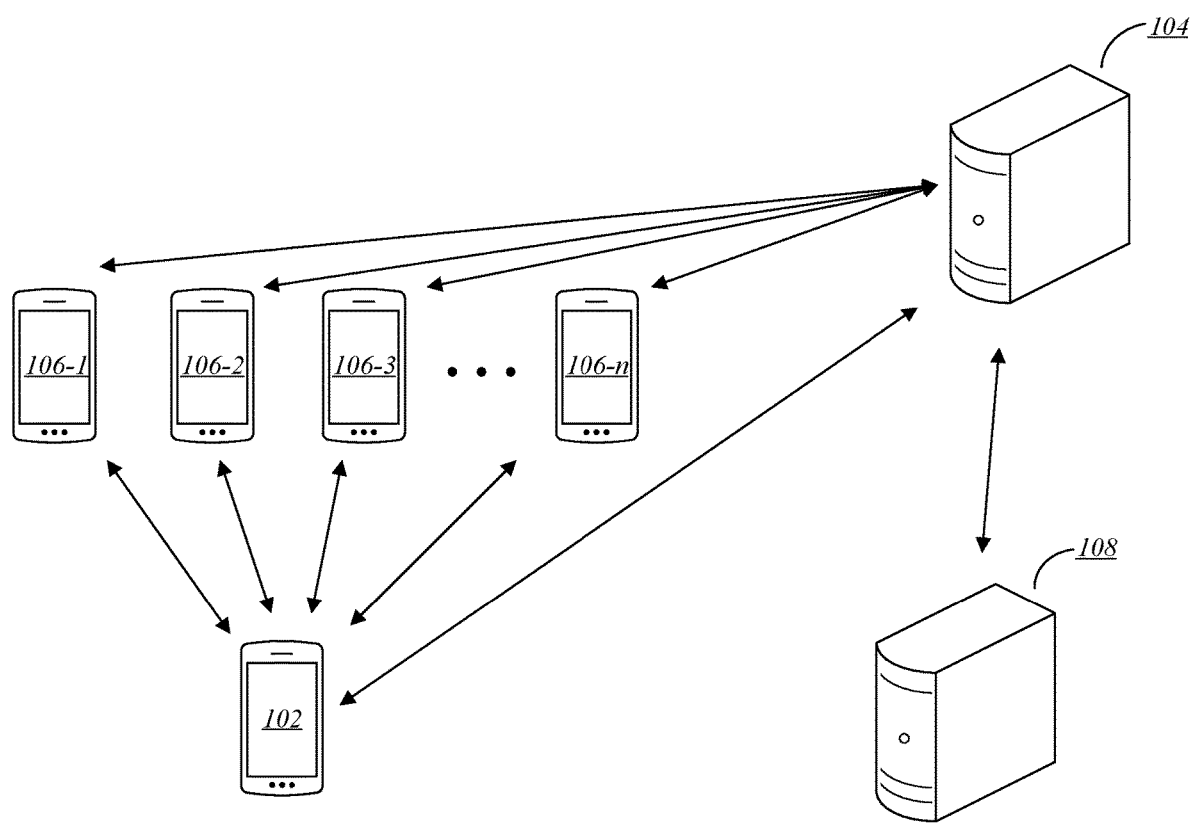
FIG. 1 illustrates an exemplary environment according to one or more embodiments described herein.

Various embodiments described herein are directed toward processing transactions and/or managing authentication protocols for at least one user engaging in a digital transaction. While financial transactions may be referenced for the sake of simplicity, it will be understood that technology described herein may be useful for a plurality of transaction types, for example, information exchanges or state changes.

Entities such as businesses, individuals, and/or other organizations may facilitate digital transactions via transaction applications of information systems. Digital transactions may include coordination, management, and/or transfer of currencies or funds relating to at least one account. Accordingly, digital transactions may include sensitive proceedings and/or information. A compromise of security relating to a digital transaction may result in a loss of funds associated with an account and/or a breach in the privacy of data for an account. A customer of an entity associated with the account may lose confidence in the entity and may choose to withdraw from the entity as a service provider.

To mitigate potential security breaches associated with digital transactions, information systems may be configured to receive authentication of a transaction before allowing completion of the transaction. For example, a transaction application may require the entry of a username and password associated with an account, a personal identification number (PIN) associated with an account, biometric data unique to a user associated with an account, or a temporary security code sent to a device associated with an account. Information systems may require multifactor authentication (MFA) before allowing completion of a transaction, which may include multiple authentication methods.

However, MFA methods may be time-consuming and/or obtrusive to a user's engagement with a transaction application. For example, a user may be required to wait for an information system to send a temporary security code to a device before they are able to, in turn, provide the code to a transaction application.

Furthermore, MFA methods may not guarantee that a user of a transaction application is the authorized user as which they were authenticated. For example, a thief may steal an authorized user's phone and thus be able to receive temporary security codes sent to the phone.

Accordingly, techniques are needed to manage authentication protocols, which will improve confidence in the legitimacy of digital transactions while improving user engagement with transaction applications. Furthermore, techniques are needed to improve confidence that digital transactions are completed based on legitimate authentication.

Embodiments described herein may remedy one or more of these challenges and weaknesses. Particularly, embodiments described herein include components that can improve management and application of authentication protocols for transactions. In embodiments, multiple devices may be registered for digital transactions and/or peer authentication. In various embodiments, an authentication protocol for a transaction may be based on the presence of two or more registered devices within a configurable distance of another. In some embodiments, one or more aspects of an authentication protocol may be bypassed based on the presence of registered devices within a configurable distance of another. In some embodiments, one or more aspects of an authentication protocol may be supplemented based on the absence of one or more registered devices within a configurable distance of another. Components described herein will, therefore, provide automated management of authentication protocols for digital transactions, thereby improving the efficiency and security of digital transaction systems. Accordingly, in various embodiments described herein, management and application of authentication protocols may be implemented in a practical application to increase the capabilities of digital transaction systems as a whole.

In various embodiments, one or more of the components, techniques, or aspects described herein may be implemented via one or more computing devices, resulting in increased capability and improved functioning of the computer devices. Specific and particular manners of automatically monitoring the presence of registered devices, analyzing the likelihood of legitimacy of a digital transaction based on one or more registered devices, and/or dynamically adjusting authentication protocols for transactions may be provided by the components described in various embodiments herein. In several embodiments, expected behaviors and behaviors involving the update and management of authentication protocols may be performed independently of software utilizing the availability management via familiar, user-friendly interface objects.

In various embodiments, components, techniques, or aspects described herein may be implemented as a set of rules that improve computer-related technology by allowing a function not previously performable by a computer that enables an improved technological result to be achieved. For example, managing an authentication protocol based on the detection of one or more registered devices may be an improved technological result.

With general reference to notations and nomenclature used herein, one or more portions of the detailed description that follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to the desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general-purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an exemplary environment 100 for managing and/or applying a digital transaction authentication protocol according to one or more embodiments described herein. The environment 100 may include a client device 102, a transaction processor 104, one or more additional registered devices such as proximal devices 106-1, 106-2, 106-3, . . . 106-*n*, where n represents a positive integer, and/or a financial service 108. Embodiments are not limited in this context.

A digital transaction may be initiated by or from a client device 102. A digital transaction may be initiated via a transaction application associated with a transaction processor 104 or via a third-party application. For example, a digital transaction may be initiated as a transfer of funds via a bank application from one account to another. In another example, a digital transaction may be initiated as an online purchase involving a transfer of funds from an account associated with a transaction processor 104.

A client device 102 may be a mobile phone, a laptop, a desktop computer, a tablet, a network-enabled accessory such as a watch, or another device capable of accessing a transaction processor 104. The client device 102 may be registered in a memory associated with a transaction processor 104, for example, in a table or other database. In particular, the client device 102 may be registered in association with a financial account of a financial service 108 to participate in at least one digital transaction and/or peer authentication of a digital transaction.

The client device 102 may cause information associated with a digital transaction to be transmitted to a transaction processor 104. Information associated with a digital transaction may include, for example, an identifier of the client device 102, an account identifier for the digital transaction, an amount of funds for the digital transaction, an intended recipient for the digital transaction, a timestamp, one or more user credentials, or any combination thereof.

A transaction processor 104 may be located on one or more servers. In many embodiments, a transaction processor 104 may support a transaction application and/or be a part of an information system for conducting and/or managing digital transactions. For example, a transaction processor 104 may support a bank application. In some embodiments, a transaction processor 104 may be at least partially located on a client device 102. For example, the functionality of a transaction processor 104 may be a part of a transaction application downloaded to a mobile device.

In response to receiving information associated with a digital transaction from a client device 102, a transaction processor 104 may recognize the client device 102 as a device registered to participate in at least one digital transaction and/or peer authentication of a digital transaction. For example, a transaction processor 104 may match a received identifier of the client device 102 for a digital transaction to an identifier in an associated memory of approved devices.

Based on the recognition of the client device 102 as a registered device, a transaction processor 104 may determine whether one or more additional registered devices, such as proximal devices 106-1, 106-2, 106-3, . . . 106-n, are co-located with or are within a configurable distance of the client device 102. A transaction processor 104 may use the co-location of the one or more additional registered devices with the client device 102 as an authentication factor for a transaction request. For example, a transaction processor 104 may use a co-location of at least one additional registered device with the client device 102 as a method of peer authentication of a transaction.

In some embodiments, a transaction processor 104 may identify one or more proximal devices 106-1, 106-2, 106-3, . . . 106-n based on known location and/or network data for each of the proximal devices 106-1, 106-2, 106-3, . . . 106-n. Location and/or network data may be known based on at least one signal received from a client device 102 and/or one or more proximal devices 106-1, 106-2, 106-3, . . . 106-n. For example, a client device 102 and one or more proximal devices 106-1, 106-2, 106-3, . . . 106-n may be enabled to share location data with a transaction processor 104 according to a user setting and/or permission. Accordingly, the transaction processor 104 may determine a colocation of one or more proximal devices 106-1, 106-2, 106-3, . . . 106-n with a client device 102. In some embodiments, a transaction processor 104 may identify at least one network to which a client device 102 and one or more proximal devices 106-1, 106-2, 106-3, . . . 106-n are connected. Based on the network connections of each of the devices, the transaction processor 104 may determine that a client device 102 and one or more proximal devices 106-1, 106-2, 106-3, . . . 106-n are located within a configurable distance of each other. For example, a transaction processor 104 may determine a colocation for the access of a client device 102 and one or more proximal devices 106-1, 106-2, 106-3, . . . 106-n based on their connection to a common network. A network may include an internet connection, a Bluetooth network, a near field communication (NFC) network, and/or another network type.

In many embodiments, a transaction processor 104 may cause a client device 102 to identify one or more proximal devices 106-1, 106-2, 106-3, . . . 106-n which are co-located with and/or within a configurable distance of a client device 102. For example, a transaction processor 104 may send an instruction to a client device 102 which may cause the client device 102 to receive one or more signals from one or more proximal devices 106-1, 106-2, 106-3, . . . 106-n indicating a location within a configurable distance of the client device 102. For example, location within a configurable distance of a client device 102 may be determined based on geographic proximity, a common location in a geographic area, a network connection, an address of the device, or other location information.

For each of the one or more proximal devices 106-1, 106-2, 106-3, . . . 106-n determined to be within a configurable distance of a client device 102, a transaction processor 104 may determine a respective device identifier. For example, a transaction processor 104 may receive a respective identifier for each of the one or more proximal devices 106-1, 106-2, 106-3, . . . 106-n co-located with a client device 102. In another example, a client device 102 may receive a respective identifier for each of the one or more co-located proximal devices 106-1, 106-2, 106-3, . . . 106-n, which the client device 102 may then provide to the transaction processor 104.

Accordingly, a transaction processor 104 may receive one or more identifiers of proximal devices 106-1, 106-2, 106-3, . . . 106-n. Based on the received identifiers, the transaction processor 104 may determine whether one or more of the co-located proximal devices 106-1, 106-2, 106-3, . . . 106-n are registered to engage in a digital transaction and/or participate in peer authentication. For example, the transaction processor 104 may search an associated memory of registered devices for the identifiers received for the one or more proximal devices 106-1, 106-2, 106-3, . . . 106-n. In some embodiments, an associated memory of registered devices may include device identifiers in association with accounts for which the device identifiers are approved to engage in digital transactions and/or participate in peer authentication. A transaction processor 104 may search an associated memory of approved devices based on any combination of an identifier for the client device 102, one or more proximal devices 106-1, 106-2, 106-3, . . . 106-n, or an account identifier so that the one or more proximal devices 106-1, 106-2, 106-3, . . . 106-n are identified in association with the client device 102 and/or an account associated therewith.

Based on the recognition of the one or more proximal devices 106-1, 106-2, 106-3, . . . 106-n as registered devices, a transaction processor 104 may select, update, and/or amend an authentication protocol for the transaction.

In some embodiments, a transaction processor 104 may estimate a probability of a transaction request originating from an authenticated user based on the one or more proximal devices 106-1, 106-2, 106-3, . . . 106-n which are determined to be registered devices. For example, a transaction processor 104 may estimate a high probability of an authentic origin of a transaction request based on an associated registered mobile phone and an associated registered smartwatch being co-located with a laptop from which the transaction request originated. The high probability of legitimacy may be estimated, for example, based on a low probability that a malicious party could acquire and/or imitate the multiple associated registered devices. Accordingly, a transaction processor 104 may use one or more proximal devices 106-1, 106-2, 106-3, . . . 106-n to provide an authenticating measure for a transaction based on their colocation with a client device 102.

A transaction processor 104 may alter an authentication procedure for a transaction based on estimated confidence in the transaction origin's legitimacy. Specifically, a transaction processor 104 may remove one or more steps of an authentication protocol for a transaction with high estimated confidence of legitimacy. In some embodiments, a transaction processor 104 may add and/or supplement one or more steps of an authentication protocol for a transaction with low estimated confidence of legitimacy. For example, a transaction processor 104 may estimate a low confidence score based on an absence of one or more registered devices from a configurable distance around an originating client device 102. The transaction processor 104 may accordingly add an authentication requirement to an authentication protocol for a digital transaction.

Using the determined authentication protocol, the transaction processor 104 may perform one or more steps to authenticate the transaction initiated by the client device 102. In some embodiments, authentication steps may include the collection of one or more additional pieces of information via a client device 102, such as user credentials.

In some embodiments, a requirement for additional information from a client device 102 may be surpassed by an authentication protocol determined by a transaction processor 104.

Based on the satisfaction of the determined authentication protocol, a transaction processor 104 may cause the digital transaction to be approved, completed, and/or denied. Specifically, the transaction processor 104 may provide an indication of an authorization result to a financial service 108 associated with an account. A financial service 108 may operate via one or more servers. The financial service 108 may complete a transaction based on a result indicating a successful authentication. The financial service 108 may deny a transaction based on a result indicating an unsuccessful authentication.

In some embodiments, a transaction processor 104 may generate one or more notifications concerning the completion of a transaction and/or of the authentication of a transaction. The transaction processor 104 may send the one or more notifications to a client device 102 and/or any of registered proximal devices 106-1, 106-2, 106-3, . . . 106-n used to provide an authenticating measure for the transaction.

Figure 2:
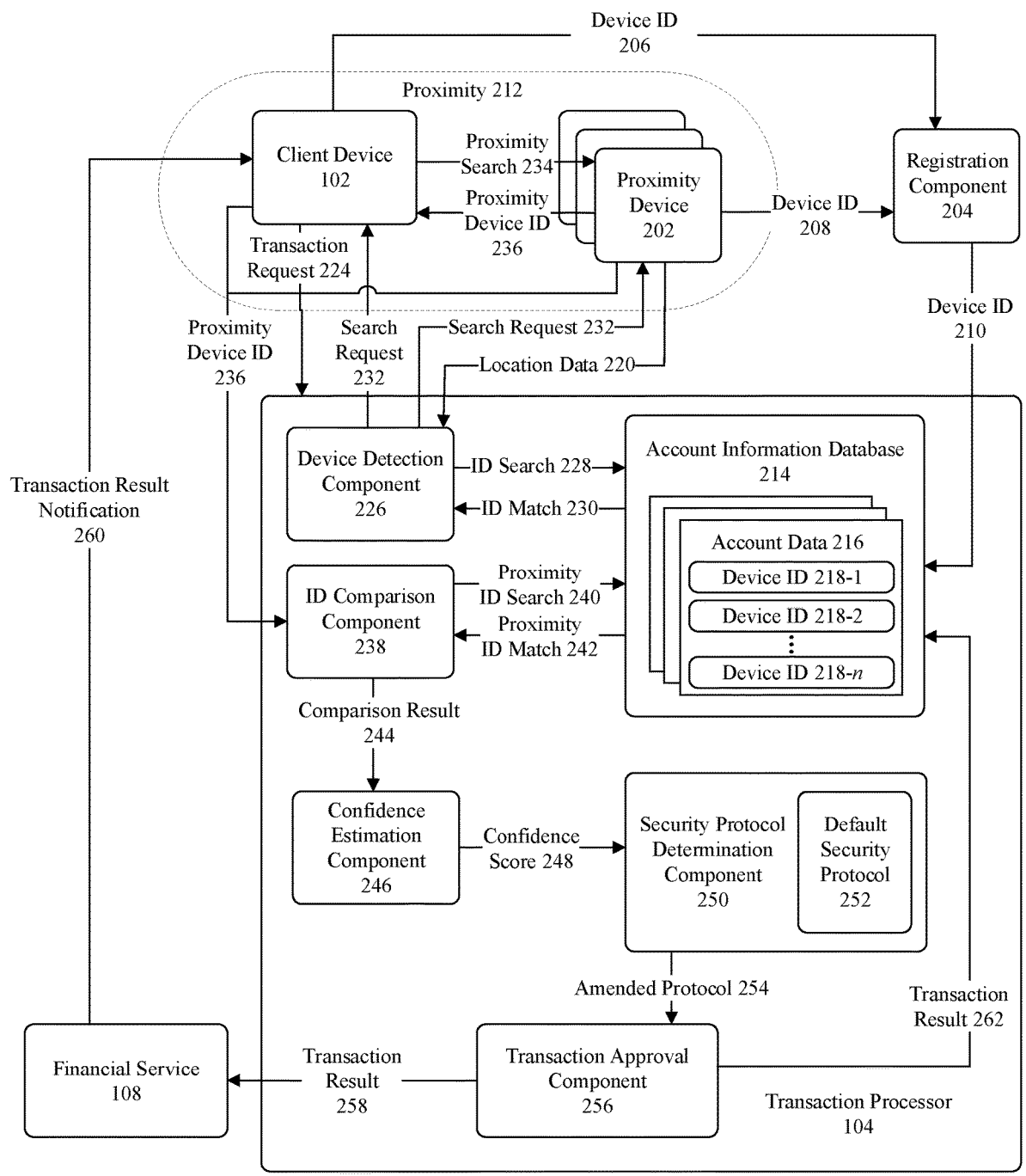
FIG. 2 is a block diagram depicting exemplary information exchange according to one or more embodiments described herein.

FIG. 2 is a detailed block diagram illustrating exemplary components that may be used in the system of FIG. 1. Components described herein may be communicatively coupled via wired connections, wireless connections, or a combination thereof. Embodiments are not limited in this context.

A client device 102, such as described with respect to FIG. 1, and at least one proximity device 202 may be registered via a registration component 204 as being approved and/or authorized to engage in a digital transaction and/or participate in a peer authentication of a transaction relating to an account. Specifically, a device identifier (ID) 206 for the client device 102 and a device ID 208 for at least one proximity device 202 may be provided to the registration component 204. A device ID 206 and/or a device ID 208 may each include a respective device serial number, phone number, internet protocol address, and/or another unique identifier. In some embodiments, device IDs 206 and 208 may be provided to a registration component 204 from their respective devices. In some embodiments, multiple device IDs may be provided to a registration component 204 from a single device. For example, a transaction application on a client device 102 may be used to register a proximity device 202 to participate in peer authentication. Accordingly, the client device 102 may provide a device ID 208 for the proximity device 202 to the registration component 204. Embodiments are not limited in this context. However, in some embodiments, a location of a proximity device 202 may not be a prerequisite for registration of the device via a registration component 204. In other words, while only the at least one proximity device 202 is illustrated as being registered via a registration component 204 for the sake of simplicity, other devices not in a proximity 212 may be registered via a registration component 204.

A proximity device 202 may be located in a proximity 212 of the client device 102. A proximity 212 may be based on a physical proximity and/or network connection as determined based upon a GPS signal, network address, connection to another device, and/or another signal. For example, a proximity 212 may be a pre-defined number of meters. A proximity 212 may be configured based on a setting, preference, and/or associated security level.

Based upon receiving a device ID 206 and/or a device ID 208, a registration component 204 may save the information thereof as device ID 210 in an account information database 214 associated with a transaction processor 104, as described with respect to FIG. 1. A registration component 204 may determine whether or not a device ID 210 is already included in an account information database 214 before saving the device ID 210 therein, only saving the device ID 210 in the account information database 214 if so doing would not create a duplicate record. In some embodiments, as illustrated in FIG. 2, a registration component 204 may be located in separate processing from a transaction processor 104. In some embodiments, a registration component 204 may be implemented in association with or as part of an account information database 214. In some embodiments, functionality of a registration component 204 may be included in processing of a transaction processor 104.

An account information database 214 may include one or more records relating to a one or more financial accounts. Records may be stored in at least one table, spreadsheet, and/or other database. In many embodiments, aspects of an account information database 214 may be queryable by one or more fields.

Records relating to a single account may make up account data 216. Account data 216 may include information useful for determining the status of and/or managing an account. For example, account data 216 may include an account identifier, a user identifier, one or more user credentials, an account balance, historic transactions relating to an account, timestamps of historic transactions relating to an account, or any combination thereof.

Account data 216 may include one or more fields specifying devices registered to engage in digital transactions and/or participate in peer-to-peer authentication of digital transactions for the account. For example, account data 216 may include device ID 218-1, device ID 218-2, . . . and device ID 218-n relating to a plurality of registered devices for a financial account. In some embodiments, account data 216 may include a level of confidence for each registered device, which may indicate a degree to which colocation of the registered device with a transaction originating device, such as client device 102, would affect a likelihood that the transaction origin would be authentic. For example, a desktop computer may be more difficult for a malicious party to steal than a mobile device, and so may accordingly be associated with a higher level of confidence than a registered mobile device.

In some embodiments, a device ID 218-1, 218-2, . . . and/or 218-n may be associated with one or more historical transactions in which the corresponding device took part in either directly or as a peer authenticator. A level of confidence associated with each device ID 218-1, 218-2, . . . and/or 218-n may be adjusted based on a historical record of an associated authenticated or unauthenticated transaction. For example, a level of confidence associated with a device ID may be increased based on each authenticated transaction for which the device of the device ID acted as a peer authenticator based on a corresponding determination that a subsequent transaction involving the device of the device ID may be authentic as well. In some embodiments, a level of confidence associated with a device ID may be determined based at least in part on a trend and/or model, including historical transaction records. For example, a neural network or machine learning method may be used to determine a confidence level using a model based on historical transaction records.

An account information database 214 may be located wholly or partially in a transaction processor. In some embodiments, an account information database 214 may be separate from a transaction processor 104, for example, as part of a financial service 108. Embodiments are not limited in this context.

A transaction processor 104 may receive a transaction request 224 from a client device 102. A transaction request 224 may be associated with a digital transaction and include, for example, an identifier of the client device 102, an account identifier for the digital transaction, an amount of funds for the digital transaction, an intended recipient for the digital transaction, a timestamp, one or more user credentials, location data for the client device 102, network connection information for the client device 102, or any combination thereof.

Based on a received transaction request 224, a device detection component 226 may cause an ID search 228 to be performed of an account information database 214. In particular, a device detection component 226 may perform or instruct a search of an account information database 214 for a device ID included in a transaction request 224. An ID search 228 may be performed based on a device ID, an associated account identifier, one or more user credentials, or other information received via the transaction request 224.

An ID search 228 may result in the identification of the searched for device ID in an account information database 214. Accordingly, an ID match 230 may be received by the device detection component 226. An ID match 230 may include an indicator that a device ID is registered in an account information database 214 to engage in and/or peer authenticate a digital transaction for an account.

Based on receiving an ID match 230, a device detection component 226 may identify at least one proximity device 202 in a proximity 212 of a client device 102, for example, based on location and/or network information of the client device 102 as received in a transaction request 224. In some embodiments, a device detection component 226 may determine a device as a proximity device 202 based on location data 220 received from the device. For example, a device detection component 226 may identify a proximity device 202 based on location and/or network information shared by the proximity device 202 with the transaction processor 104.

In some embodiments, a device detection component 226 may issue a search request 232 to one or more of a client device 102 or at least one proximity device 202.

If a search request 232 is issued to a client device 102, the search request 232 may cause the client device 102 to initiate a proximity search 234 for at least one proximity device 202. A proximity search 234 may identify at least one proximity device 202 based on a geographically and/or network-based co-location with the client device 102. For example, a client device 102 may recognize a network connection with a proximity device 202 as part of a proximity search 234 and accordingly identify the proximity device 202. Based on the proximity search 234, the client device 102 may receive and/or identify at least one proximity device ID 236, respectively relating to the at least one identified proximity device 202. The client device 102 may then provide the proximity device ID 236 to the transaction processor 104.

A search request 232 may be issued to at least one proximity device 202 instead of to a client device 102. A device detection component 226 may access one or more devices, which may be at least one proximity device 202. For example, a device detection component 226 may query devices identified as being connected to the same network as a client device 102. Based on the search request 232 sent to at least one proximity device 202, a transaction processor 104 may receive a proximity device ID 236 from the at least one proximity device 202.

An ID comparison component 238 of the transaction processor 104 may receive a proximity device ID 236 from a client device 102 and/or a proximity device 202. An ID comparison component 238 may initiate a proximity ID search 240 of an account information database 214 for information received in the proximity device ID 236. In particular, an ID comparison component 238 may perform or instruct a search of an account information database 214 for a device ID included in a proximity device ID 236. A proximity ID search 240 may be performed based on a device ID, an account identifier with the proximity device ID 236 or the transaction request 224, one or more user credentials, or other information received via the proximity device ID 236.

A proximity ID search 240 may result in the identification of the searched for device ID in an account information database 214. Accordingly, a proximity ID match 242 may be received by the ID comparison component 238. A proximity ID match 242 may include an indicator that a proximity device ID is registered in an account information database 214 to engage in and/or peer authenticate a digital transaction for an account. In some embodiments, a proximity ID match 242 may include at least one level of confidence associated with the matched ID of the proximity device ID 236.

Based on the proximity ID match 242, an ID comparison component 238 may provide a comparison result 244 to a confidence estimation component 246. A comparison result 244 may provide an indication a client device 102 and at least one registered proximity device 202 being located within a configurable distance of each other. A comparison result 244 may, in some embodiments, include at least one indication of a level of confidence associated with the identified registered proximity device 202.

A confidence estimation component 246 may generate a confidence score 248 for the transaction. The confidence score 248 may be based on one or more levels of confidence associated with transactions involving one or more of the client device 102 or the at least one proximity device 202.

The confidence estimation component 246 may provide a confidence score 248 to a security protocol determination component 250. Based on the confidence score 248, the security protocol determination component 250 may select a security protocol for the transaction. In some embodiments, the security protocol determination component 250 may adjust a default security protocol 252 based on the confidence score 248. For example, based on a high confidence score 248, a security protocol determination component 250 may generate an amended protocol 254 from a default security protocol 252 by bypassing one or more steps of the default security protocol 252 and/or by replacing one or more steps of the default security protocol 252 with one or more steps with a greater convenience for a user. In another example, based on a low confidence score 248, a security protocol determination component 250 may generate an amended protocol 254 from a default security protocol 252 by adding one or more steps of the default security protocol 252 and/or by replacing one or more steps of the default security protocol 252 with one or more steps with a higher requirement for authentication.

A security protocol determination component 250 may provide an amended protocol 254 to a transaction approval component 256. A transaction approval component 256 may determine a transaction result 258 based on an amended protocol 254. A transaction result 258 may include an indication of whether or not a transaction meets the requirements of an authentication protocol. In some embodiments, a transaction processor 104 may collect additional information from one of a client device 102 or at least one proximity device 202 in order to determine whether or not a transaction meets the requirements of an amended authentication protocol. For example, a transaction processor 104 may receive at least one of an additional user credential, security code, component of biometric data, other data useful for authenticating a user, or any combination thereof.

A transaction approval component 256 may send a transaction result 258 to a financial service 108. The financial service 108 may complete a transaction based on a result indicating that a transaction meets the requirements of an authentication protocol. The financial service 108 may deny a transaction based on a result indicating that a transaction does not meet the requirements of an authentication protocol.

In some embodiments, a financial service 108 may send a transaction result notification 260 to a client device 102. A transaction result notification 260 may communicate an authentication result and/or approval or denial of a transaction.

In some embodiments, a transaction approval component 256 may provide a transaction result 262 to an account information database. The transaction result 262 may include an indication of whether or not a transaction meets the requirements of an authentication protocol. Based on a transaction result 262, one or more aspects of an account information database 214 may be updated. In particular, a confidence level associated with a device ID 218-1, 218-2, . . . and/or 218-$n$ may be adjusted based on the involvement of a respective associated device in a transaction as a client device 102 or a proximity device 202. For example, a confidence level for a device ID 218-1, 218-2, . . . and/or 218-$n$ may be increased based on the association of the device ID with a transaction meeting requirements of an authentication protocol. In another example, a confidence level for a device ID 218-1, 218-2, . . . and/or 218-$n$ may be decreased based on the association of the device ID with a transaction failing to meet the requirements of an authentication protocol. In some embodiments, a transaction result 262 may be used to update a model and/or record by which a confidence level is determined.

Figure 3B:
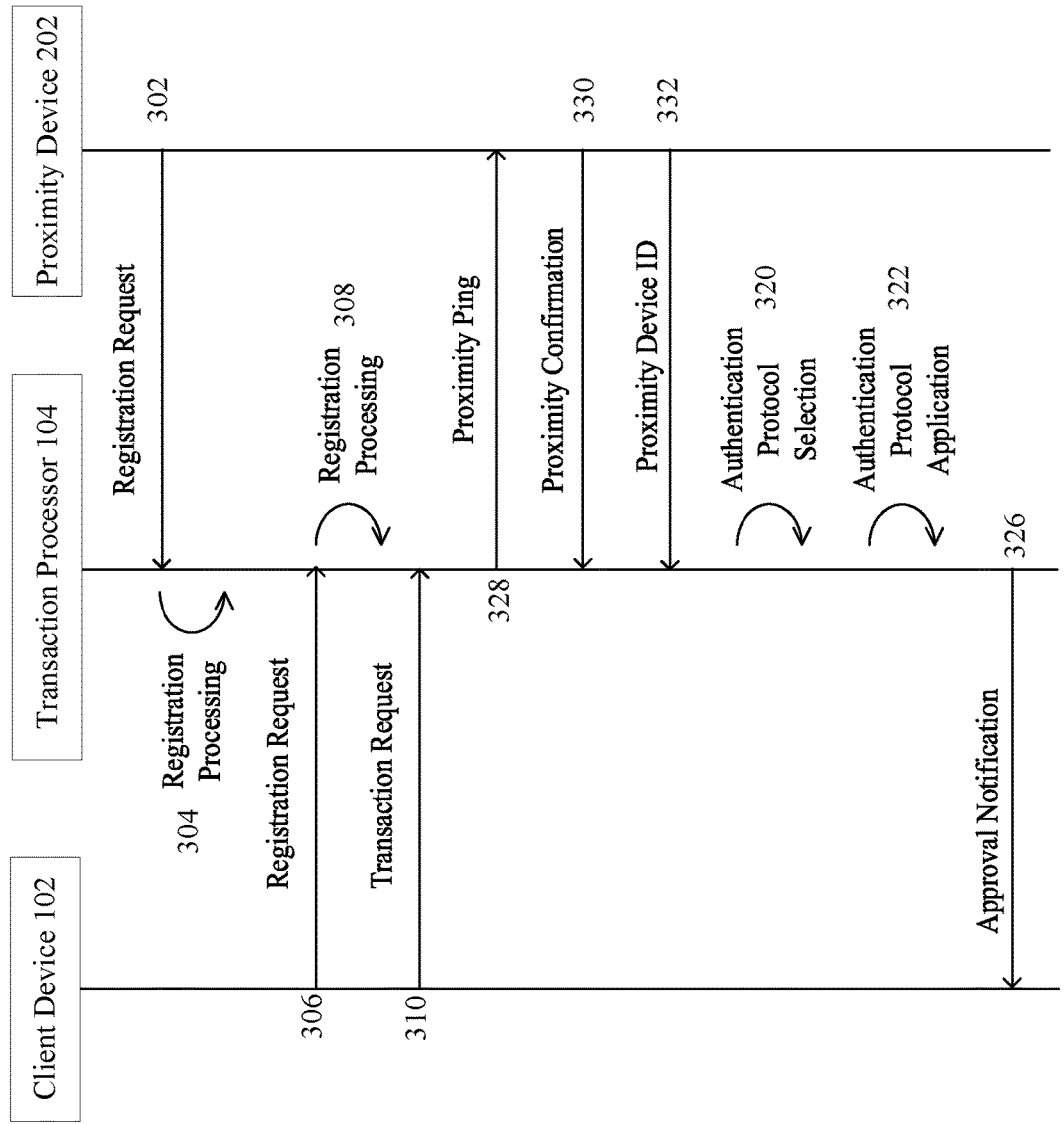

FIGS. 3A-B illustrate exemplary information flows according to embodiments described herein. Embodiments are not limited in this context.

With respect to FIG. 3A, proximity device 202, such as described with respect to FIG. 2, may send a registration request 302 to a transaction processor 104, such as described with respect to FIG. 1. With respect to the description regarding FIG. 2, a registration request 302 may include one or more aspects of a device ID 208. A registration request 302 may be received by a registration component 204. A registration request 302 may specify that a proximity device 202 is to be registered to engage in and/or participate in peer authentication of digital transactions. Registration processing 304 at the transaction processor 104 may result in information for the proximity device 202 as received in the registration request 302 being saved to an account information database 214.

A client device 102, such as described with respect to FIG. 1, may send a registration request 306 to a transaction processor 104. With respect to the description regarding FIG. 2, a registration request 306 may include one or more aspects of a device ID 206. A registration request 306 may be received by a registration component 204. A registration request 306 may specify that a client device 102 is to be registered to engage in and/or participate in peer authentication of digital transactions. Registration processing 308 at the transaction processor 104 may result in information for the client device 102 as received in the registration request 306 being saved to an account information database 214.

Information exchanges of a registration request 302 and registration request 306 may, in some embodiments, include information useful for authenticating a user of a respective proximity device 202 and client device 102. For example, at least one registration request 302 and registration request 306 may include Information exchanges of a registration request 306 and registration processing 308 may, in various embodiments, precede exchanges of a registration request 302 and registration processing 304. In some embodiments, a registration request 302 and registration processing 304 may take place multiple times for multiple proximity devices 202. Embodiments are not limited in this context.

A transaction request 310 may be received by a transaction processor 104 from a client device 102. A transaction request 310 may be associated with a digital transaction and include, for example, an identifier of the client device 102, an account identifier for the digital transaction, an amount of funds for the digital transaction, an intended recipient for the digital transaction, a timestamp, one or more user credentials, location data for the client device 102, network connection information for the client device 102, or any combination thereof. In several embodiments, a transaction request 310 may include one or more components of information useful for authenticating a user of a client device 102, such as user credentials for an account of a financial service 108 associated with the user.

Based on receiving a transaction request 310, a proximity search request 312 may be sent from a transaction processor 104 to a client device 102. A proximity search request 312 may cause a client device 102 to identify one or more devices within a configurable distance of the client device 102. In some embodiments, a client device 102 may issue at least one proximity ping 314, which may be detected by a device or devices within a range and/or on a network of the client device 102. In some embodiments, a client device 102 may issue a proximity ping 314 to a device based on an indication that the device may be within a range of and/or on a network of the client device 102. For example, an indication that the device may be within a range of and/or on a network of the client device 102 may be based on received location data 220, as described with respect to FIG. 2. A proximity ping 314 may include an identifier of the client device 102. In some embodiments, a proximity ping 314 may include location data for the client device 102, information defining a range around the client device 102, or both.

A proximity ping 314 may be received by a proximity device 202. Based on receiving a proximity ping 314, a proximity device 202 may send a proximity confirmation 316 to a client device 102. In some embodiments, a proximity device 202 may send a proximity confirmation 316 to a client device 102 based on a determination that the proximity device 202 is within a configurable distance or range of the client device 102. For example, the proximity device 202 may use location data of a proximity ping from a client device 102 to determine if the proximity device 202 is within a defined range of each other. In another example, the proximity device 202 may determine if it is within a range of a client device 102 based on information about the range being included in a proximity ping 314. A proximity confirmation 316 may include a device ID of a proximity device 202, such as proximity device ID 236 as described with respect to FIG. 2.

A client device 102 may receive a proximity confirmation 316 from a proximity device 202. In various embodiments, a client device 102 may receive proximity confirmations from various proximity devices. Based on receiving at least one proximity confirmation 316, a client device 102 may send at least one proximity device ID 318 to a transaction processor 104. In some embodiments, a proximity device ID 318 may be similar in one or more aspects to a proximity device ID 236.

Based on receiving at least one proximity device ID 318, a transaction processor 104 may perform an authentication protocol selection 320. An authentication protocol selection 320 may include the selection of one of a plurality of aspects of pre-determined authentication protocols, customization of a pre-determined authentication protocol, or another duration of an authentication protocol. In some embodiments, transaction processor 104 may base a selection of an authentication protocol on the at least one proximity device ID 318. For example, a confidence estimation component 246 of the transaction processor 104, such as described with respect to FIG. 2, may determine a measure of confidence that a user of the client device 102 may be an authentic user and/or that a transaction request 310 is legitimate. In some embodiments, a security protocol determination component 250 of the transaction processor 104, such as described with respect to FIG. 2, may select, amend, or otherwise determine aspects of an authentication protocol.

Based on an authentication protocol selection 320, a transaction processor 104 may proceed in an authentication protocol application 322. In an authentication protocol application 322, a transaction processor 104 may use a selected authentication protocol to determine if a transaction request 310 corresponds to a valid transaction attempt. In some embodiments, a transaction processor 104 may determine, based on an authentication protocol application 322, if a transaction of a transaction request 310 should be approved, denied, marked for further review, or any combination thereof, thereby generating a transaction recommendation. In some embodiments, a transaction processor 104 may mark or generate a tag for a transaction based on an associated transaction recommendation generated via an authentication protocol application 322. In some embodiments, a transaction processor 104 may approve a transaction, deny a transaction, gather additional information related to a transaction, or any combination thereof based on a transaction recommendation generated via an authentication protocol application 322.

In some embodiments, an approval, denial, marking of a transaction for review, reception of information related to the transaction, of a combination thereof may be performed by a transaction processor 104 in conjunction with a financial service 108. For example, based on an authentication protocol application 322, a transaction processor 104 may provide a transaction result 324 to a financial service 108. The financial service 108 may approve or deny a transaction based on the transaction result 324. In some embodiments, a financial service 108 may mark a transaction for further review before approval.

In some embodiments, a transaction processor 104 may send an approval notification 326 to a client device 102 based on a result of an authentication protocol application 322. For example, an approval notification 326 may indicate that a transaction has been approved, denied, and/or marked for further review. In some embodiments, an approval notification 326 may include a request for additional information or confirmation of the authenticity related to a transaction request 310 from a client device 102. For example, additional information or an additional confirmation step may be necessary for the satisfaction of an authentication protocol application 322 based on an authentication protocol selection 320. Requested information of an approval notification 326 may pertain to a client device 102, a proximity device 202 (not illustrated), or both. Based on an approval notification 326, a client device 102 may provide additional authentication information to the transaction processor 104. In some embodiments, the additional authentication information may be received as part of a secondary transaction request 310 related to the first transaction request 310. Based on the received information, a transaction processor 104 may maintain a previous authentication protocol selection 320 or a subsequent authentication protocol selection 320 to replace the results of the prior authentication protocol selection 320. Accordingly, a subsequent authentication protocol application 322 may employ a selected authentication protocol based on up-to-date authentication information received by the transaction processor 104.

FIG. 3B illustrates a second information flow according to various embodiments described herein. FIG. 3B includes various information exchanges, as discussed with respect to FIG. 3A. For the sake of conciseness, these exchanges will not be described redundantly, but it will be understood that corresponding descriptions elsewhere in the disclosure may partially or fully apply. Embodiments are not limited in this context.

For example, a transaction processor 104 may receive a registration request 302 from a proximity device 202. Accordingly, the transaction processor 104 may engage in registration processing 304. The transaction processor 104 may receive a registration request 306 from a client device 102 and accordingly perform registration processing 308. The transaction processor 104 may receive a transaction request 310 from a client device 102.

As illustrated in FIG. 3B, the transaction processor 104 may send a proximity ping 328 to a proximity device 202 based on the received transaction request 310. In some embodiments, the proximity ping 328 may be sent to a set of one or more devices, networks, and/or locations based on information received in the transaction request 310 and/or the registration request 306 relating to the client device 102. For example, a proximity ping 328 may be sent to a plurality of devices within a range of location data received in a transaction request 310 for the client device 102. In some embodiments, a proximity ping 328 may include information relating to the client device 102, such as a device identifier, a network identifier, location information, other identifying information, or any combination thereof.

The transaction processor 104 may receive a proximity confirmation 330 from a proximity device 202. In many embodiments, the proximity device 202 may send the proximity confirmation 330 based on receiving the proximity ping 328.

In some embodiments, a proximity device 202 may provide a proximity device ID 332 to a transaction processor 104 based on a determination that the proximity device 202 is within a configurable range of the client device 102. For example, a determination that the proximity device 202 is within a configurable range of the client device 102 may be based on the reception of a proximity ping 328 by the proximity device 202 and/or based on information contained in a proximity ping 328 received by the proximity device 202. A proximity device ID 332 may include an identifier for the proximity device 202, an identifier for at least one account over which the proximity device 202 may have authority to execute digital transactions, location data, user credentials, other data useful for authentication, or any combination thereof. In some embodiments, a proximity confirmation 330 may include one or more aspects of a proximity device ID 332.

Based on receiving information of a proximity confirmation 330 and/or a proximity device ID 332, a transaction processor 104 may perform an authentication protocol selection 320. Based on the authentication protocol selection 320, the transaction processor 104 may perform an authentication protocol application 322. Based on the results of the authentication protocol application 322, the transaction processor 104 may issue an approval notification 326.

Figure 4:
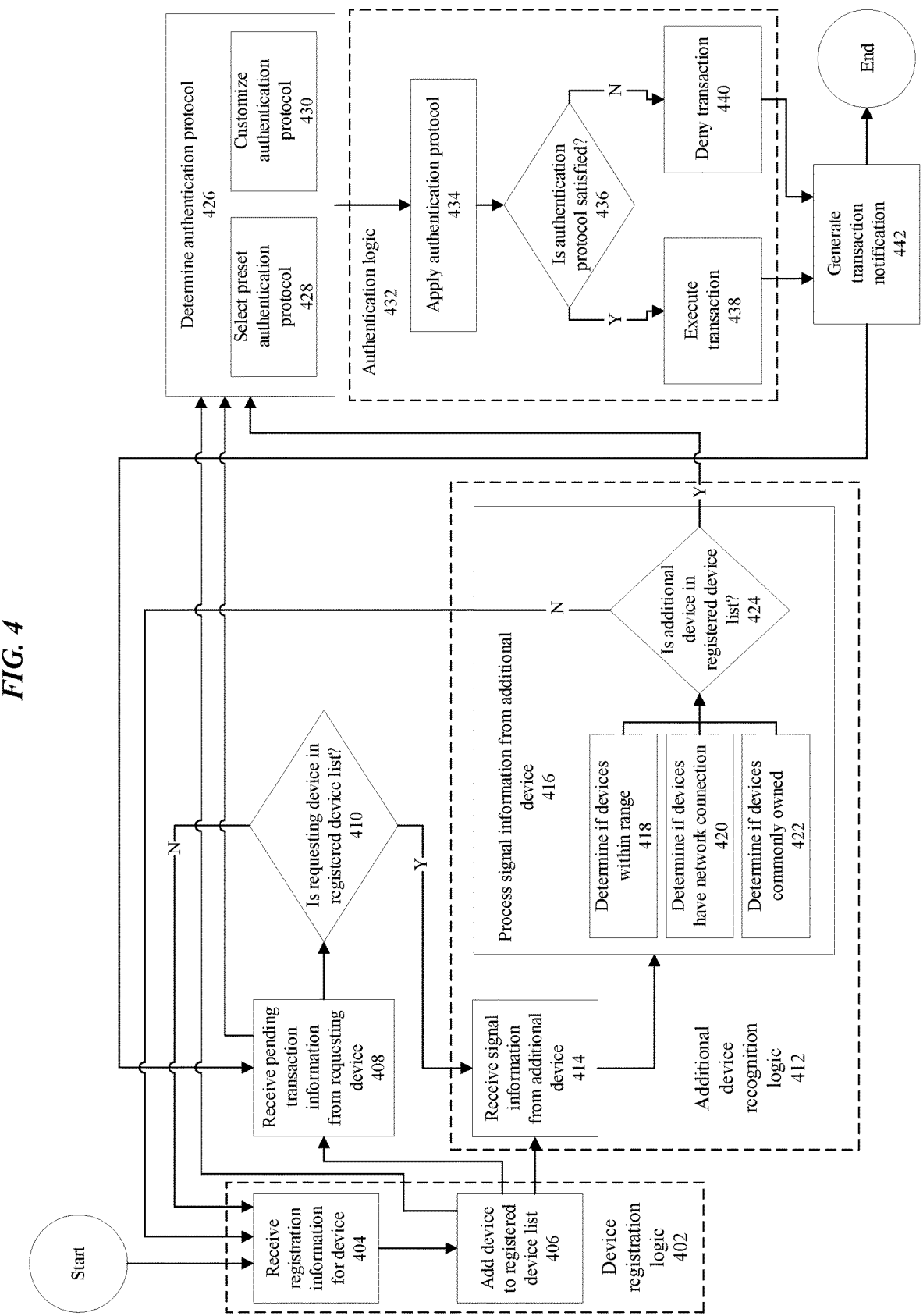
FIG. 4 is a flowchart depicting exemplary transaction processing techniques according to one or more embodiments described herein.

FIG. 4 illustrates exemplary logic flow according to one or more embodiments described herein. Logic steps are displayed as blocks, although it will be understood that various embodiments may employ steps in addition to those illustrated in FIG. 4, various embodiments may not employ all of the steps illustrated in FIG. 4, and/or various embodiments may employ steps according to a different order or organization that that illustrated in FIG. 4. Additionally, various logic steps may be described with respect to exemplary components, as described in the present disclosure. For the sake of conciseness, these components will not be described redundantly, but it will be understood that corresponding descriptions elsewhere in the disclosure may partially or fully apply. Embodiments are not limited in this context.

Processing may begin at device registration logic 402, which may include block 404 and/or 406. In particular, at device registration logic 402, logic at block 404 may receive registration information for a device. A device for which registration information is received may be a client device 102 or a proximity device 202. A device for which registration information is received may, in various embodiments, include an integrated circuit configured to execute electronic transactions. An integrated circuit may be configured to execute electronic transactions against an account, such as a financial account. Registration information may include an identifier for the device and/or for an account for which a device is configured to execute electronic transactions. Registration information may be received at block 404 as part of a registration request 302 and/or a registration request 306.

From block 404, processing may be handed off to block 406, at which point the device related to the received registration information may be added to a list or other database of devices registered to have authority over a financial account. For example, information about the device, such as an identifier for the device and/or associated account information for the device, may be added to an account information database 214 via registration processing 304 and/or registration processing 308.

Device registration logic 402 may be performed by a registration component 204 and/or a transaction processor 104. While FIG. 4 illustrates only a single procession of logic through device registration logic 402, one or more steps of device registration logic 402 may be repeated with relation to the same device and/or to at least one additional device. For example, device registration logic 402 may be repeated with respect to a client device 102 so as to update information in an account information database 214. In another example, device registration logic 402 may be performed with respect to a client device 102 and separately with respect to at least one proximity device 202 so that an account information database 214 is populated with registration information for a plurality of devices for one or more accounts.

From device registration logic 402, logic may proceed to block 408. At block 408, logic may receive pending transaction information from a requesting device. Pending transaction information may pertain to a particular transaction, as in a transaction request 310. A requesting device may be a client device 102. Pending transaction information may include information relating to the requesting device such as a device identifier, an identifier of an account associated with the device, network information for the device, location data for the device, user credentials, other authentication information, or any combination thereof.

Processing may proceed from block 408 to block 410. At block 410, logic may determine as part of an authentication protocol if a requesting device of block 408 is in a list or other database of devices registered to have authority over a financial account, e.g., enabled to performed transactions and make updates with the financial account. For example, logic may determine if an identifier for the requesting device is registered in an account information database 214 as being authorized to conduct transactions against an account associated with the pending transaction of block 408.

In some embodiments, if the requesting device is determined to not be registered in a list or other database of devices registered to conduct a transaction against an account of the pending transaction, processing may end (not shown), or logic may receive additional information related to the pending transaction from the requesting device. For example, logic may receive additional information, for example, authentication information and/or a device ID, for the requesting device. In some embodiments, additional information may be received for the requesting device by device registration logic 402. For example, logic of block 404 may receive registration information for the requesting device of block 408, and logic of block 406 may subsequently add the device to a registered device list as described above. In some embodiments, if device registration logic 402 has added a device to a registered device list based on the previously unregistered device being associated with a pending transaction as a requesting device of block 408, processing may progress directly from block 406 to additional device recognition logic 412. In other words, processing may be accordingly streamlined to not require an additional reception of pending transaction information or an additional check for the requesting device in the registered device list before processing is allowed to continue to block 414.

If the requesting device is determined to be registered in a list or other database of devices registered to conduct a transaction against an account of the pending transaction, processing may be handed off from block 410 to additional device recognition logic 412. Additional device recognition logic 412 may include block 414 and/or block 416.

At block 414, logic may, as part of an authentication protocol, receive signal information from a device other than the device of blocks 408 and 410. For example, signal information may be received from a proximity device 202. Signal information may include information such as a device identifier, an identifier of an account associated with the device, network information for the device, location data for the device, user credentials, other authentication information, or any combination thereof. Signal information relating to the additional device may be received as a proximity confirmation 330 and/or proximity device ID 332. In some embodiments, signal information relating to the additional device may be received from the requesting device, such as with proximity device ID 318. For example, the device of the requested pending transaction, as described with respect to block 408, may request signal information of a proximity device 202 and accordingly provide the signal information to logic of block 414 and/or block 416.

In some embodiments, logic at block 414 may be performed in response to the additional device proactively sending information. Logic of block 414 may be performed, in some embodiments, before or during previously described logic steps. For example, logic of block 414 may collect information relating to the additional device prior to logic receiving pending transaction information from a requesting device at block 408. In some embodiments, logic of block 414 may receive signal information relating to the additional device based on a request to the additional device. For example, signal information may be received based on a proximity search request 312 or a proximity ping 328.

From block 414, processing may proceed to block 416. At block 416, logic may process signal information relating to the additional device as received at block 414. As part of block 416, logic may determine if, based on the signal information from the additional device, the additional device may be used to determine remaining aspects of an authentication protocol at block 426. Processing of block 416 may include one or more of block 418, block 420, block 422, or block 424.

At block 418, logic may determine if, based on the signal information received from the additional device at block 414, the additional device is within a configurable range of the requesting device recognized by logic of block 408. For example, logic at block 418 may determine if the distance between location data received for the requesting device and location data received for the additional device is below a threshold value.

At block 420, logic may determine if, based on the signal information received from the additional device at block 414 and/or information received related to the requesting device of block 408, the additional device and the requesting device are connected via a network connection. For example, the signal information received from the additional device at block 414 and/or information received related to the requesting device of block 408 may contain at least one identifier of a network to which the respective device is connected. Logic at block 420 may accordingly compare the network connections of the devices to determine a common connection. In another example, the signal information received from the additional device at block 414 and/or information received related to the requesting device of block 408 may include a list of devices to which the respective devices is connected via a network connection. Logic at block 420 may accordingly determine that the requesting device and the additional device are connected to each other via a network.

At block 422, logic may determine, based on the signal information received from the additional device at block 414 and/or information received related to the requesting device of block 408, the requesting device and the additional device are commonly owned. For example, the signal information received from the additional device at block 414 and/or information received related to the requesting device of block 408 may include an identifier of an associated user. In some embodiments, an entry for one or more of the requesting device and the additional device may be associated with an identifier of a user in a registered device list or other database, such as referenced with respect to description of block 410. Logic at block 422 may accordingly compare associated user information for the requesting device and the additional device to determine common ownership of the devices.

In FIG. 4, block 418, block 420, and block 422 are shown as alternative options of block 416. However, embodiments may perform multiple of the blocks in any order. In some embodiments, a failure of logic at block 418 to determine that the devices are within a range of each other, a failure of logic at block 420 to determine a common network connection of the devices, a failure of logic at block 422 to determine common ownership of the devices, or any combination thereof may prompt logic of block 416 to engage the logic of one or more of the other blocks 418, 420, or 422. Based on a success of logic at block 418 to determine that the devices are within a range of each other, a success of logic at block 420 to determine a common network connection of the devices, a success of logic at block 422 to determine common ownership of the devices, or any combination thereof, processing may be handed off to logic of block 424.

In some embodiments, only a single success of logic at block 418 to determine that the devices are within a range of each other, of logic at block 420 to determine a common network connection of the devices, or of logic at block 422 to determine common ownership may be required by block 416 to proceed to block 424. In other embodiments, success may be required for multiple of the blocks 418, 420, or 422. In some embodiments, logic of block 416 may generate a score of confidence that the additional device of the signal information received at block 414 may be used to determine aspects of an authentication protocol for a pending transaction of block 408. A confidence score may be based on determinations of one or more of blocks 418, 420, and/or 422. Processing may proceed to block 424 based on the confidence score being above a threshold, in some embodiments, or regardless of the result of a confidence score determination.

At block 424, logic may determine if the additional device indicated in the signal information received at block 414 is in a list or other database of devices authorized to conduct electronic transactions against an account or to participate in peer authentication of a device authorized to conduct electronic transactions against an account. In many embodiments, logic of block 424 may determine if an identifier of the additional device is an entry of an account information database 214 in association with an account of a pending transaction and/or a requesting device of block 408.

In some embodiments, if the additional device is determined to not be registered in a list or other database of devices registered to conduct a transaction against an account of the pending transaction or to participate in peer authentication of a transaction against an account of the pending transaction, processing may end (not shown), or logic may receive additional information from the additional device. For example, logic may receive authentication information and/or a device ID for the additional device. In some embodiments, additional information may be received for the additional device by device registration logic 402. For example, logic of block 404 may receive registration information for the additional device of block 408, and logic of block 406 may subsequently add the additional device to a registered device list as described above. In some embodiments, if device registration logic 402 has added a device to a registered device list based on the previously unregistered device being an additional device as recognized by logic of block 416, processing may progress directly from block 406 to block 426.

If the additional device is determined by logic of block 424 to be registered in a list or other database of devices registered to conduct a transaction against an account of the pending transaction or to participate in a peer authentication thereof, logic at block 416 may determine a suitability of the additional device to act as a peer authenticator of the pending transaction of block 408. Processing may be handed off from block 424 to block 426.

While FIG. 4 illustrates only a single procession of logic through additional device recognition logic 412, one or more steps of additional device recognition logic 412 may be repeated with relation to the same device and/or to at least one additional device. For example, additional device recognition logic 412 may be performed with respect to at least one additional proximity device 202 so that logic may process signal information received from multiple additional devices, one or more of which may be determined by logic of block 416 to be useful for affecting a determination of remaining steps of an authentication protocol at block 426.

Logic at block 426 may determine remaining aspects of an authentication protocol for the pending transaction of block 408. Logic at block 426 may select one or more aspects of an authentication protocol based on the registration of one or more of the requesting device of block 408 and the additional device of block 414 in a registered device list. For example, logic may determine the registration of one or more additional device of block 414 in a registered device list to be a peer authentication of the pending transaction of block 408. Based on the peer authentication, logic at block 426 may estimate a confidence in the authenticity of a transaction. Logic at block 426 may determine aspects of an authentication protocol based on the estimated confidence in transaction authenticity.

Processing of block 426 may be performed by logic at one or both of block 428 and block 430. In some embodiments, logic of block 428 may select a default security protocol, such as default security protocol 252, based on peer authentication of a pending transaction. In some embodiments, logic may select a default security protocol for a pending transaction from a plurality of default security protocols, wherein each default security protocol is associated with a level of security and a level of practical efficiency for one or more of a transaction processing system or a customer. Logic may select a default security protocol based on an estimated confidence in transaction authenticity and at least one of a known level of security or a level of efficiency for the default security protocol.

Logic of block 430 may customize a security protocol based on peer authentication of a pending transaction. In some embodiments, logic may create a custom authentication protocol for a transaction by compiling one or more authentication steps, each associated with one or more of a level of security and a level of efficiency, to create a protocol with a total level of security and/or level of efficiency to match an estimated confidence in the authenticity of a transaction based on a peer authentication. In other embodiments, logic may curate a custom authentication protocol for a transaction by amending a default security protocol 252. For example, logic may customize or amend a default authentication protocol by bypassing one or more portions of a security procedure or authentication protocol based on peer authentication as determined by logic of block 416. A bypassed portion may include, for example, requesting a credential item or a non-credential item. For example, a credential item may include a user name, a password, an answer to a security question, biometric data, a security code, or other information available only to an authenticated user. A non-credential item may include information other than credential item that may nonetheless contribute to a confidence in the authenticity of a transaction request, such as a confirmation of transaction intent when a value of funds of a transaction is above a threshold, a performance of a task such as selection of an image from a plurality of images or of entry of a displayed text, or other information.

In some embodiments, logic of block 426 may determine a more stringent authentication protocol as compared to a default security protocol based on a lack of a peer authentication of a transaction. For example, if a number of additional devices under a threshold or a confidence in contributing security of one or more additional devices is determined be below a value, logic of block 426 may determine a stricter authentication protocol than a default security protocol. In some embodiments, if a requesting device of block 408 and/or an additional device of block 414 is not determined to be registered in a registered device list, processing may proceed to block 426 with or without registering the device according to device registration logic 402. Based on a present or historic lack of registration of a device in association with a pending transaction, logic of block 426 may determine a stricter or more stringent authentication protocol as compared to a default authentication protocol. In many embodiments, a stricter or more stringent authentication protocol may be associated with a higher level of security and/or a lower level of efficiency than a default authentication protocol.

In some embodiments, aspects of an authentication protocol may be determined by logic of block 426 prior to logic receiving pending transaction information from the requesting device at block 408 and/or receiving signal information from an additional device at block 414. Predetermined aspects of an authentication protocol may be associated with criteria of one or more additional devices being used in peer authentication for a pending transaction associated with a financial service 108 and/or with an account thereof. Accordingly, when all additional devices required by the criteria have been successfully identified as being available for peer authentication of a pending transaction by logic of block 416, the remaining steps of an authentication protocol may be executed.

In some embodiments, some steps of an authentication protocol may be executed prior to logic receiving pending transaction information from the requesting device at block 408 and/or receiving signal information from an additional device at block 414. Accordingly, a successful identification of an additional device may be final requirement of an authentication protocol such that recognition of the additional device by logic at block 416 may result in the execution of the pending transaction.

From block 426, processing may proceed to authentication logic 432. Authentication logic 432 may process a pending transaction based on an authentication protocol determined at block 426. Authentication logic 432 may include logic of one or more of block 434, block 436, block 438, or block 440. One or more aspects of authentication logic 432 may be performed at a transaction processor 104, a financial service 108, or both.

At block 434, logic may apply one or more aspects of an authentication protocol determined by logic of block 426 to a pending transaction of a pending transaction of block 408. Logic may apply information received at one or more of block 408, block 414, information associated with a requesting device and/or additional device in a registered device list, information otherwise known to a financial system and/or transaction processor relating to an account of the pending transaction, or any combination thereof to one or more aspects of the authentication protocol.

At block 436, logic may determine if the determined authentication protocol is satisfied for the pending transaction. Satisfaction of an authentication protocol may require a complete verification of all or fewer than all steps of the authentication protocol. In some embodiments, authentication logic 432 at one or both of block 434 or block 436 may determine a satisfaction score for the pending transaction based on the satisfaction one or more aspects of an authentication protocol for the pending transaction. If the satisfaction score is above a threshold, logic may proceed to block 438. Otherwise, logic may proceed to block 440.

At block 438, logic may approve and/or execute the pending transaction based on a satisfaction of the one or more aspects of an authentication protocol determined by logic at block 426. At block 440, logic may deny the pending transaction based on a failure to satisfy the one or more aspects of an authentication protocol determined by logic at block 426. In some embodiments, logic may flag either an execution of a transaction at block 438 or a denial of a transaction at block 440 for further analysis.

Based on processing at either block 438 or block 440, logic of block 442 may generate a transaction notification, such as approval notification 326. A transaction notification may be generated by logic operated at a transaction processor 104 and/or a financial service 108. Logic may send the transaction notification to a client device 102, a proximity device 202, a financial service 108, or any combination thereof.

A transaction notification may include an indication of whether a transaction was approved and/or executed, denied, marked for further review, or any combination thereof. In some embodiments, if a transaction has been denied and/or marked for further review, a transaction notification may include a request for one or more additional pieces of information which may be useful for satisfying a authentication protocol. Subsequently, logic at block 408 may receive additional information for the same transaction from the requesting device. Alternatively, logic at block 414 may receive additional information from an additional device based on the transaction notification (not shown). Based on receiving additional information related to a transaction according to a transaction notification, processing may proceed through the logic flow as discussed above, or processing may be handed off directly to logic of block 426 or to authentication logic 432 (not shown). Based on the previously acquired information and the additional information, logic at block 426 may select the same or different aspects of an authentication protocol for the transaction. For example, additional information received may allow the logic of block 426 to select a less strict or stringent security process than a previously selected authentication protocol of a denied transaction.

One or more techniques described with respect to FIG. 4 may be executed by one or more external systems. For example, a financial analyzer 108 may be an external system operated on one or more servers, or one or more aspects of a transaction processor 104 may operate via an external system. Accordingly, any or all of the logic components described with respect to FIG. 4 may include an instruction to an external system to operate in accordance with the techniques described herein. For example, a transaction processor 104 may instruct an external system including a financial service 108 to bypass a request for a non-credential item or a credential item as part of an authentication protocol, according to at least one peer authentication of a pending transaction.

Figure 5:
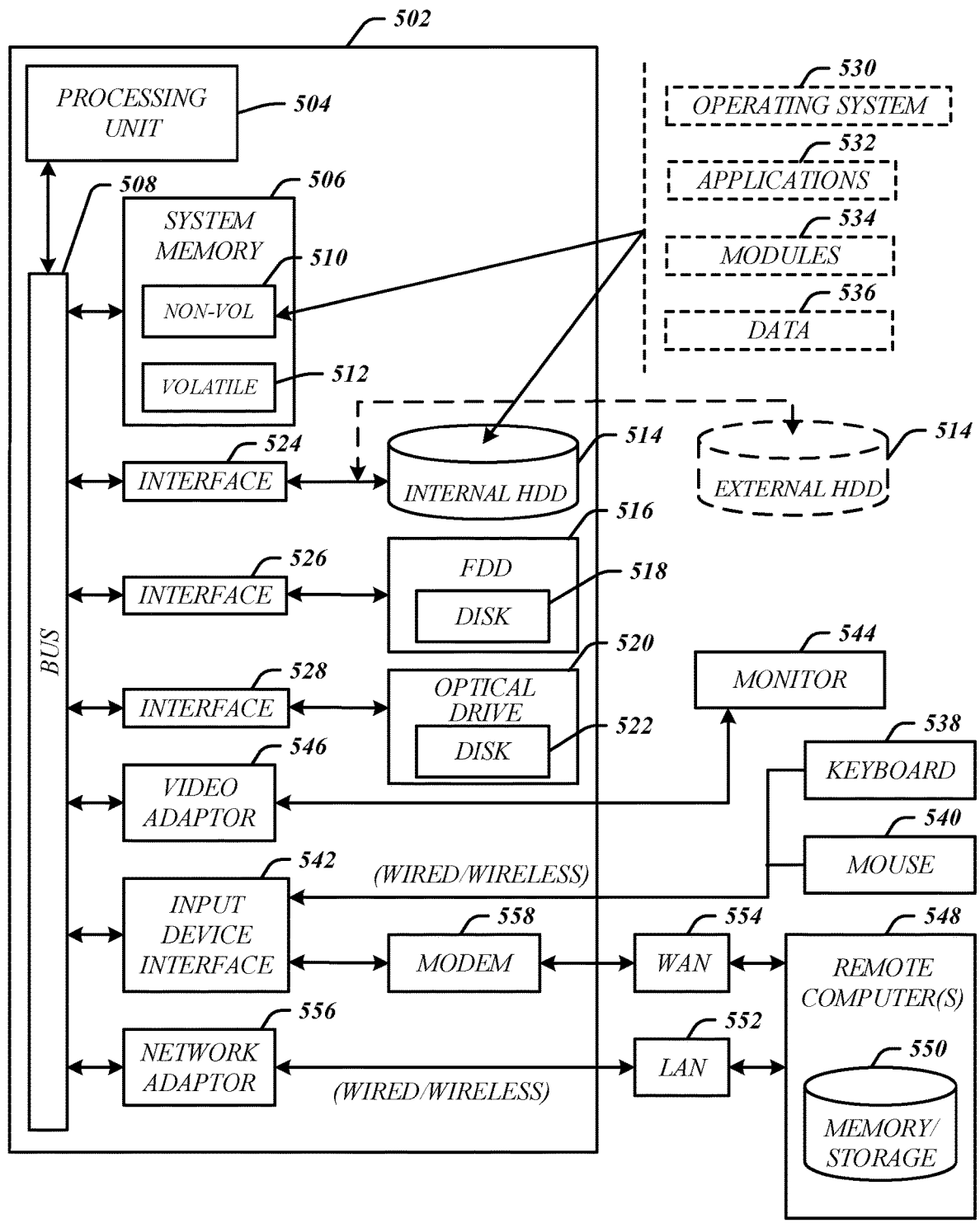
FIG. 5 is a block diagram depicting an exemplary computing architecture for use with techniques described herein.

FIG. 5 illustrates an embodiment of an exemplary computing architecture 500 that may be suitable for implementing various embodiments as previously described. In various embodiments, the computing architecture 500 may include or be implemented as part of an electronic device. In some embodiments, the computing architecture 500 may be representative, for example, of one or more component described herein. In some embodiments, computing architecture 500 may be representative, for example, of a computing device that implements or utilizes one or more of a client device 102, a transaction processor 104, a proximity device 202, a financial service 108, and/or one or more techniques described herein. Embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes a processing unit 504, a system memory 506 and a system bus 508. The processing unit 504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 504.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. In some embodiments, system memory 506 may include main memory. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and Institute of Electrical and Electronics Engineers (IEEE) 694 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include or implement, for example, the various techniques, applications, and/or components described herein.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508, but can be connected by other interfaces such as a parallel port, IEEE 994 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. In various embodiments, one or more migrations may occur via the networked environment. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 6:
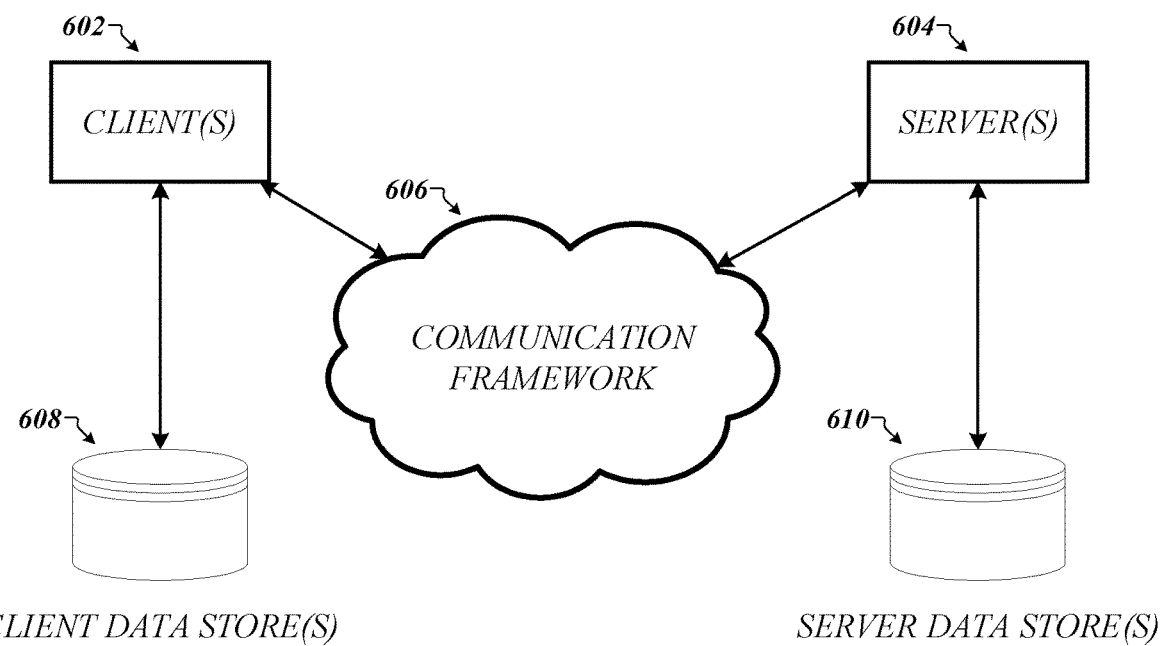
FIG. 6 is a block diagram depicting an exemplary communications architecture suitable for use with techniques described herein.

FIG. 6 illustrates a block diagram of an exemplary communications architecture 600 suitable for implementing various embodiments as previously described, such as virtual machine migration. The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600.

As shown in FIG. 6, the communications architecture 600 includes includes one or more clients 602 and servers 604. In some embodiments communications architecture may include or implement one or more portions of components, applications, and/or techniques described herein. For example, a client device 102, a transaction processor 104, and/or a financial service 108 as described in connection to FIG. 1 may operate as a client 602. In another example, a proximity device 202 as described with respect to FIG. 2 may operate on a server 604. The clients 602 and the servers 604 are operatively connected to one or more respective client data stores 608 and server data stores 610 that can be employed to store information local to the respective clients 602 and servers 604, such as cookies and/or associated contextual information. In various embodiments, any one of servers 604 may implement one or more of logic flows or operations described herein in conjunction with storage of data received from any one of clients 602 on any of server data stores 610. In one or more embodiments, one or more of client data store(s) 608 or server data store(s) 610 may include memory accessible to one or more portions of components, applications, and/or techniques described herein.

The clients 602 and the servers 604 may communicate information between each other using a communication framework 606. The communications framework 606 may implement any well-known communications techniques and protocols. The communications framework 606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 602 and the servers 604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various users or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The invention claimed is:

1. An apparatus, comprising:
a processing circuit; and
logic stored in computer memory and executed on the processing circuit, the logic operative to cause the processing circuit to:
receive a transaction request against a user account, the transaction request being received from a first computing device;
identify a second computing device within a configurable distance of the first computing device;
determine that the first computing device and the second computing device are members of a group of computing devices;
determine a security procedure to authenticate the transaction request by receiving data from the second computing device, the data from the second computing device being forwarded to the apparatus by the first computing device, wherein the data identifies the second computing device; and
execute at least a first portion of the security procedure to authenticate the transaction request, the first portion including requiring a first factor of authentication in a multi-factor authentication process, and bypass at least a second portion of the security procedure, the second portion including requiring a second factor of authentication in the multi-factor authentication process;
wherein the transaction request is a pending transaction against the user account; and
wherein the pending transaction includes transaction information including one or more of the following a device identifier of the first computing device, an identifier of the user account, network information for the first computing device, location data for the first computing device, user credentials, or authentication information.

2. The apparatus of claim 1, wherein the processing circuit is further caused to process registration information comprising at least one identifier for each computing device of the group of computing devices having authority over the user account, at least one computing device in the group comprising an integrated circuit being configured to execute electronic transactions, including the transaction request, against the user account.

3. The apparatus of claim 1, wherein the processing circuit is further caused to execute an authentication protocol to determine whether the first computing device and the second computing device are members of the group of computing devices;
wherein the processing circuit being caused to execute the authentication protocol includes the processing circuit caused to determine one or more of:
that the second computing device is in a same network as the first computing device;
a network connection between the first computing device and the second computing device; and
that the first computing device and the second computing device are collocated within a configurable number of meters.

4. The apparatus of claim 1, wherein the processing circuit is further caused to identify the second computing device within the configurable distance of the first computing device based on the first computing device and the second computing device being connected to a common network; or
wherein the processing circuit is further caused to identify the second computing device within the configurable distance of the first computing device based on the first computing device and the second computing device being within a configurable distance determined based on geographic proximity, a common location in a geographic area, a network connection, or an address of the first computing device and the second computing device.

5. The apparatus of claim 4, wherein the common network is selected from the group consisting of: an internet connection, a Bluetooth network, and a near field communication network (NFC).

6. The apparatus of claim 1, wherein the processing circuit is further caused to authenticate the first computing device based on the first computing device and the second computing device being members of the group of computing devices; and
wherein the processing circuit is further caused to execute the transaction request based upon a successful authentication of the first computing device.

7. A computer-implemented method executed on a processing circuit, the method comprising:
receiving a transaction request associated with an account, the transaction request received from a first computing device;
identifying a second computing device within a configurable distance of the first computing device;
determining that the first computing device and the second computing device are members of a group of computing devices;
determining a security procedure to authenticate the transaction request by receiving data from the second computing device, the data from the second computing device being forwarded to the processing circuit by the first computing device, wherein the data identifies the second computing device; and
executing at least a first portion of the security procedure to authenticate the transaction request, the first portion including requiring a first factor of authentication in a multi-factor authentication process, and bypassing at least a second portion of the security procedure, the second portion including requiring a second factor of authentication in the multi-factor authentication process;
wherein the transaction request is a pending transaction against the account; and
wherein the pending transaction includes transaction information including one or more of the following a device identifier of the first computing device, an identifier of the account, network information for the first computing device, location data for the first computing device, user credentials, or authentication information.

8. The computer-implemented method of claim 7, further comprising processing registration information comprising at least one identifier for each computing device of the group of computing devices having authority over the account, at least one computing device in the group comprising an integrated circuit being configured to execute electronic transactions, including the transaction request, against the account.

9. The computer-implemented method of claim 7, wherein the processing circuit is further caused to execute an authentication protocol to determine whether the first computing device and the second computing device are members are members of the group of computing device;
  wherein the processing circuit being caused to execute the authentication protocol includes the processing circuit caused to determine one or more of:
    that the second computing device is in a same network as the first computing device;
    a network connection between the first computing device and the second computing device; and
    that the first computing device and the second computing device are collocated within a configurable number of meters.

10. The computer-implemented method of claim 7, further comprising identifying the second computing device within the configurable distance of the first computing device based on the first computing device and the second computing device being connected to a common network; or
  Further comprising identifying the second computing device within the configurable distance of the first computing device based on the first computing device and the second computing device being within a configurable distance determined based on geographic proximity, a common location in a geographic area, a network connection, or an address of the first computing device and the second computing device.

11. The computer-implemented method of claim 10, wherein the common network is selected from the group consisting of: an internet connection, a Bluetooth network, and a near field communication network (NFC).

12. The computer-implemented method of claim 7, further comprising authenticating the first computing device based on the first computing device and the second computing device being members of the group of computing devices; and
  executing the transaction request based upon a successful authentication of the first computing device.

13. At least one non-transitory computer-readable storage medium comprising instructions that, when executed by a processing circuit, cause a system to:
  receive a transaction request against a user account, the transaction request received from a first computing device;
  identify a second computing device within a configurable distance of the first computing device;
  determine that the first computing device and the second computing device are members of a group of computing devices;
  determine a security procedure to authenticate the transaction request by receiving data from the second computing device, the data from the second computing device being forwarded to the processing circuit by the first computing device, wherein the data identifies the second computing device; and
  execute at least a first portion of the security procedure to authenticate the transaction request, the first portion including requiring a first factor of authentication in a multi-factor authentication process, and bypass at least a second portion of the security procedure, the second portion including requiring a second factor of authentication in the multi-factor authentication process;
  wherein the transaction request is a pending transaction against the user account; and
  wherein the pending transaction includes transaction information including one or more of the following a device identifier of the first computing device, an identifier of the user account, network information for the first computing device, location data for the first computing device, user credentials, or authentication information.

14. The at least one non-transitory computer-readable storage medium of claim 13, wherein the system is further caused to process registration information comprising at least one identifier for each computing device of the group of computing devices having authority over the user account, at least one computing device in the group comprising an integrated circuit being configured to execute electronic transactions, including the transaction request, against the user account.

15. The at least one non-transitory computer-readable storage medium of claim 13, wherein the system is further caused to execute an authentication protocol to determine whether the first computing device and the second computing device are members are members of the group of computing device;
  wherein the system being caused to execute the authentication protocol includes the system caused to determine one or more of:
    that the second computing device is in a same network as the first computing device;
    a network connection between the first computing device and the second computing device; and
    that the first computing device and the second computing device are collocated within a configurable number of meters.

16. The at least one non-transitory computer-readable storage medium of claim 13, wherein the system is further caused to identify the second computing device within the configurable distance of the first computing device based on the first computing device and the second computing device being connected to a common network, wherein the common network is selected from the group consisting of: an internet connection, a Bluetooth network, and a near field communication network (NFC); or
  wherein the system is further caused to identify the second computing device within a the configurable distance of the first computing device based on the first computing device and the second computing device being within a configurable distance determined based on geographic proximity, a common location in a geographic area, a network connection, or an address of the first computing device and the second computing device.

17. The at least one non-transitory computer-readable storage medium of claim 13, wherein the system is further caused to authenticate the first computing device based on the first computing device and the second computing device being members of the group of computing devices; and
  wherein the system is further caused to execute the transaction request based upon a successful authentication of the first computing device.

* * * * *